United States Patent
Budrys et al.

(10) Patent No.: US 7,086,011 B2
(45) Date of Patent: Aug. 1, 2006

(54) MULTI-COMPONENT ICONIC REPRESENTATION OF FILE CHARACTERISTICS

(75) Inventors: Audrius J. Budrys, Mountain View, CA (US); Giordano B. Beretta, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 09/916,939

(22) Filed: Jul. 27, 2001

(65) Prior Publication Data

US 2003/0020762 A1    Jan. 30, 2003

(51) Int. Cl.
*G06F 17/00* (2006.01)

(52) U.S. Cl. ............... 715/837; 715/762; 715/765
(58) Field of Classification Search ........... 345/837, 345/762, 765
See application file for complete search history.

(56) References Cited

U.S. PATENT DOCUMENTS

| | | | | |
|---|---|---|---|---|
| 5,021,976 A * | 6/1991 | Wexelblat et al. | ........... | 715/853 |
| 5,586,237 A | 12/1996 | Baecker et al. | ........... | 395/133 |
| 5,727,174 A * | 3/1998 | Aparicio et al. | ........... | 345/837 |
| 5,797,139 A | 8/1998 | Amro | ........... | 707/100 |
| 6,160,554 A | 12/2000 | Krause | ........... | 345/348 |
| 6,337,699 B1 * | 1/2002 | Nielsen | ........... | 345/837 |
| 6,414,697 B1 * | 7/2002 | Amro et al. | ........... | 345/772 |
| 6,459,441 B1 * | 10/2002 | Perroux et al. | ........... | 345/837 |
| 6,501,490 B1 * | 12/2002 | Bell | ........... | 345/837 |
| 6,570,597 B1 * | 5/2003 | Seki et al. | ........... | 345/835 |
| 6,639,614 B1 * | 10/2003 | Kosslyn et al. | ........... | 715/837 |
| 6,670,974 B1 * | 12/2003 | McKnight et al. | ........... | 345/855 |

\* cited by examiner

*Primary Examiner*—Weilun Lo
*Assistant Examiner*—Sara Hanne

(57) ABSTRACT

A multi-component icon and system and method of generating thereof. The multi-component icon is generated from characteristics of a data object or data objects where the characteristics include data object content and data object metadata. The multi-component icon includes a plurality of visual traits. Each visual trait has a plurality of variations, such as different shapes, colors, and/or patterns. The visual traits are variably assignable to any one characteristic of the data object such that each variation of the characteristic is visually represented by the icon by a corresponding variation of the variably assignable visual trait. Multi-component icons are generated for groups of data objects, such as word processing files, by determining common characteristics between the files, assigning visual traits to the common characteristics, and then displaying the multi-component icons according to the assignments such that variations of the common characteristic between the files are symbolically show by variations of the assigned visual trait. Icon visual traits are interactive so as to indicate relationships between data object characteristics by "dragging" one icon over another.

7 Claims, 3 Drawing Sheets

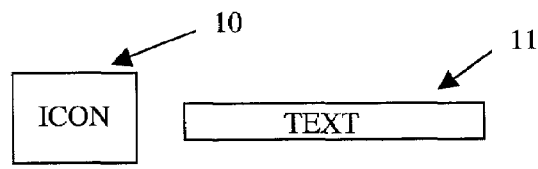
FIG. 1
PRIOR ART
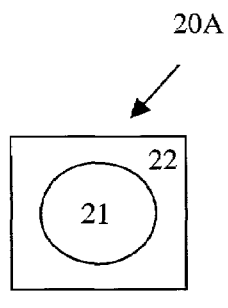 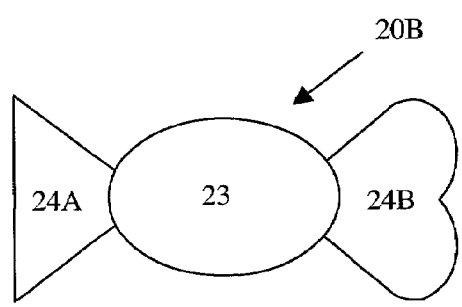 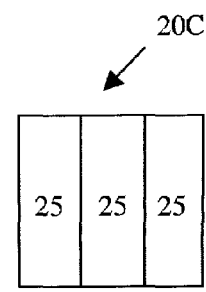
FIG. 2A  FIG. 2B  FIG. 2C
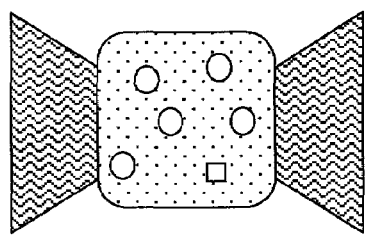 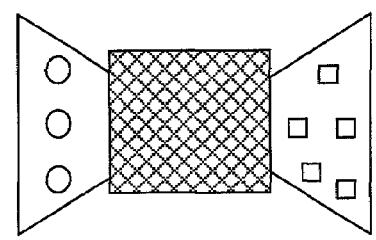
FIG. 3A  FIG. 3B

MULTI-COMPONENT ICONIC REPRESENTATION OF FILE CHARACTERISTICS

FIELD OF THE INVENTION

The present invention relates to icons displayed on a computer screen to list and identify files and folders, and in particular, to icons that symbolically represent characteristics of files and folders.

BACKGROUND OF THE INVENTION

In a computer system, icons are used to represent and identify data objects (also referred to as files) and groupings of data objects (also referred to as "folders"). The data objects are stored within the computer system storage area (i.e. digital memory) and when the cursor is moved over the icon and the user input interface is activated, the selected data object is selected and accessed from memory. When a file is accessed and it corresponds to, for example, a text document, the document is displayed on the computer screen. When a folder is accessed (i.e. "opened"), a window is displayed showing a listing of the files that the folder holds.

In one common prior art method, the icon used to represent the folder is embodied as a small image of a manila folder. The icon used to represent a file often corresponds to a combination of the application or software program that created the file and the file type. For instance, if a document is created by a particular word processing application, then the icon used to represent the document file is embodied as an icon (10, FIG. 1) representative of that particular word processing application and file type (e.g., .rtf, .doc, .jpg, etc.). As a result, all documents created by the same word processing application are often represented by the same icon and need further identification. In order to identify these files, user specified text (11) (often referred to as the filename) may be inserted to the side or beneath the icon to identify the contents of the file.

In addition, many icons are often simultaneously displayed on the computer screen to provide the user with a list of files and folders to choose from. However, the problem is that each file potentially can be identified by the same icon, making it difficult to discern between the files and folders. Moreover, reading through the filenames can be tedious, inaccurate, or lacking information.

In another prior art technique, icons are represented by corresponding "thumbnails" of the file contents or portions of the contents. Hence, this type of icon is embodied as a miniature of the actual file contents (or a portion thereof) instead of a symbolic representation of the file. This technique can be useful if the user wants to get information about the contents of the file without opening it, however, it does not provide a convenient way to manage, view, compare common characteristics, or quickly discern between many listed files displayed on a computer screen. Consequently, this icon simply provides the user a way to view the contents of an individual file without the inconvenience of "opening" it.

In another prior art technique, icons are generated having an outside border for symbolically representing one aspect of the file and having an inside portion for symbolically representing another aspect of the file. The outside border represents file type. For instance, different patterns of the border corresponds to different file formats (i.e., .doc, .txt, .jpg). The center of the icon symbolically represents the parent application used to create the file. Hence, the combination of the border and center patterns of the icon symbolically show information relating to the file type and application type. However, this symbolic icon does not provide information relating to the file contents and consequently does not provide the user a way to discern easily between the many files.

In another prior art technique for viewing a listing of files on a computer screen, when a cursor is moved over a file icon, a textual display of information appears next to the icon which describes a variety of information about the file. Hence, in this case, icons are still used to symbolically represent the word processing application and additional information about the file is explicitly displayed dependent on the users actions.

The problem with these file identification and listing techniques is that they provide very specific and limited amounts of information primarily for the purpose of avoiding "opening" file. Moreover, these icons do not provide a manner in which to manipulate, compare, and evaluate the file listing in the case in which files have common characteristics. For instance, a user may want to identify files or identify similarities between files so as to group/categorize them or to obtain statistical data about them without "opening" each file. The user may also want to compare a variety of common characteristics, not specific information like file type, using the symbolic information provided by the icons.

As a specific example, a teacher may have the answers to a number of different tests for a large number of students stored in a plurality of files (one file per test taken by a student) that are listed/represented on a display screen of a computer system by a plurality of icons. In order to ascertain statistical information about the students, tests, test questions, etc. the teacher may want to determine how many of the students answered a particular question wrong on a particular test during a particular grading period just from viewing the icon listing of test files. That same teacher may later want to re-group the listing of test file icons to ascertain other statistical information regarding the tests. However, none of the above file identification techniques allow the logical grouping of files by symbolically identifying common characteristics between listed files using an icon.

What would be desirable is a multi-component icon that identifies characteristics of a data object that allows the user to intuitively display icons so as to compare common file characteristics between many displayed customized icons.

SUMMARY OF THE INVENTION

A multi-component icon and a method of generating thereof. The multi-component icon is generated from characteristics of a data object or data objects where the characteristics include data object content and data object metadata. The multi-component icon includes a plurality of visual traits each having a plurality of visual variations, each trait being variably assignable to any characteristic of the data object wherein each variation of the characteristic is visually represented by the icon by a corresponding one visual variation of a variably assignable visual trait.

According to the method of the present invention, the multi-component icon is generated by providing an icon having a plurality of visual traits each having a plurality of visual variations and variably assigning a visual trait to any characteristic of the data object wherein each variation of the characteristic is visually represented by the icon by a corresponding variation of the assigned visual trait.

In another method of the present invention a multi-component icon is generated for each of a set of data objects from characteristics of the set of data objects where the characteristics include data object content and data object metadata. The multi-component icon is generated by identifying a characteristic common to the set of data objects, determining the number of variations associated with the common characteristic, determining a visual trait of the multi-component icon having a corresponding number of visual variations that are greater than or equal to the number of variations of the common characteristic and assigning it to the common characteristic, and displaying the customized icons for the set of data objects according to the assignment of the visual traits to the common characteristic.

BRIEF DESCRIPTION OF THE DRAWINGS

The objects, features, and advantages of the present invention will be apparent to one skilled in the art, in view of following detailed description in which:

FIG. 1 illustrates a prior art icon format including a symbolic word processing document icon and adjacent textual filename;

FIGS. 2A–2C illustrate embodiments of the multi-component icon according to the present invention and corresponding visual traits;

FIGS. 3A–3G show examples of visual variations of multi-component icons according to the present invention;

DETAILED DESCRIPTION OF THE INVENTION

The present invention is a multi-component icon generated from a data object or group of data objects and methods of generating thereof. In general, the icon makes it possible to view an icon listing of data objects in an intuitive manner so as to ascertain characteristic information about each file and about common characteristics between the files without accessing (i.e., "opening") each file.

FIGS. 2A–2C show various embodiments of the multi-component icon in accordance with the present invention. The multi-component icons have visual traits comprising of at least one portion. For instance, icon 20A (FIG. 2A) has visual traits including portions 21 and 22, icon 20B (FIG. 2B) has visual traits including body portion 23 and wing portions 24, and icon 20C has visual traits including portions 25.

Figure 3C:
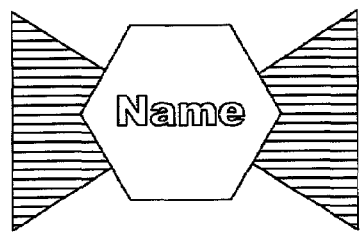

Each of the visual traits (e.g., portions) has corresponding visual variations. For example, visual variations of each of portions 21–25 can include but are not limited to variations in color, in shape, in pattern, in opacity, in translucency, and in transparency. FIGS. 3A–3D show examples of icon 20B (FIG. 2B) having visual variations to portions 23 and 24. Specifically, FIGS. 3A–3D show the body portion 23 having three body shape variations including rounded square, square, and hexagon. In addition, FIGS. 3A and 3B show the body portion visual trait 23 having two pattern variations (i.e., pin dots and diamond pattern). Similarly, FIGS. 3A–3D show the adjacent wing portions 24 having four pattern variations (i.e., squiggle lines, circles and squares, vertical lines, and horizontal lines). In one embodiment, icon 20B is designed to bear a resemblance to an ornamental Venetian glass candy. It should further be noted that although symmetrical designs are shown, the multi-component icon need not be symmetrical.

In one embodiment, the variations may also have secondary variations. For instance, variations in the number of circles and squares shown in FIGS. 3A and 3B may represent a parent variation of a file characteristic while variations in the color or pattern of the circles and squares may represent variations within the parent variation.

Figure 3D:
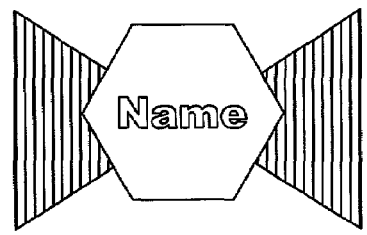

Textual information in the icon may embody visual variations of the portions as shown in FIGS. 3C and 3D. For instance, a name may be inserted in the center of the body portion 23.

The visual traits as shown in FIGS. 2 and 3 are variably assignable to any characteristic of a data object such that variations in the characteristic are represented by corresponding visual variations in the assigned visual trait. For purposes of this application, a data object, or file, can be defined as a block of data stored in memory that, when accessed, causes the computer system to perform predefined functions. Examples of data objects include, but are not limited to, word processing files, executable files, software applications, audio files, image files, video files, print spool queues, "stickie" notes or any block of memory that can be represented by a listing of icons on a display screen that allow a user to select between the data objects.

The characteristics of a data object relate to any differentiating aspect that can be used to characterize the data object. The characteristics can fall into two categories, data content or metadata. Data content is generally defined as the data stored in the memory or displayed on the computer screen. For instance, in the case of a word processing file, the data content is what is displayed on the computer screen when the file is accessed, data content of an executable file is the executable code stored in memory, the data content of an audio file is audible sounds, and data content of an image is the image displayed on the computer screen. Metadata is generally defined as any differentiating aspect of the data object other than data content which can include (but is not limited to) author of the data object, time or date of creation of the data object, memory area size of data object, history of authorship of the data object, history of who has reviewed/opened the data object, copyright, title, keyword etc. In one embodiment, data objects may have tags or pointers that point to a metadata file that includes formatted metadata characterizing the data object. Metadata files may be created upon the creation of the data object and may be modified each time the data object is modified and the metadata changes. In this way, metadata can be easily evaluated for each data object by accessing its corresponding metadata file. Metadata can also be changed independently of objects. For example, indexing is often a separate and open-ended process performed independently from the objects.

A visual trait of the icon is variably assigned to a characteristic such that a given visual trait, such as the wings shown in FIG. 3A, is not strictly assigned to one particular data object characteristic but instead can be assigned to any one characteristic of the data object. For instance, in the case in which a plurality of files corresponding to test answers is to be represented by icon 20B (FIG. 2B), the visual variations (e.g., variations in color) of the wing portion 24 can be assigned to the characteristic of the subject matter of the test such that different subjects are represented by different wing colors (i.e., math can be represented by a first wing color, English can be represented by a second wing color, etc.). Visual variations (e.g., variations in patterns) of the body portion 23, on the other hand, can be assigned to the characteristic of the class period such that different class periods correspond to different body patterns (i.e., class period 1 is represented by a first pattern, class period 2 is represented by to a second pattern, etc.).

Figure 4:
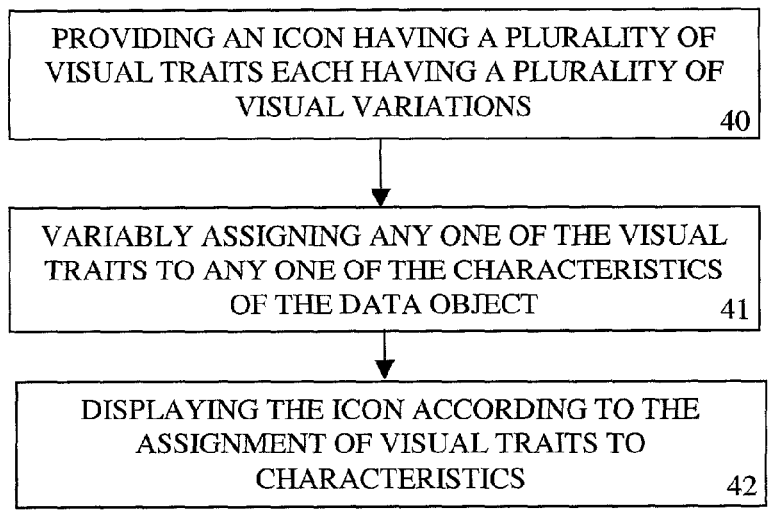
FIG. 4 illustrates a method of generating the multi-component icon according to the present invention.

A first embodiment of the method for generating a multi-component icon according to the present invention (FIG. 4) includes providing an icon having a plurality of visual traits where each visual trait has visual variations (block 40). For instance, an icon such as shown in FIG. 2B can be provided having a plurality of visual traits including body 23, left wing 24A, and right wing 24B each trait having visual variations including shape, color, and opacity, etc.

Any one of the visual traits are variably assigned to any one of the characteristics of the data object such that each variation of the characteristic is represented by a corresponding visual variation of the assigned visual trait (block 41). Continuing the current example, the characteristic of the month that a word processing document was created can be assigned to the trait of the icon corresponding to the right wing (24, FIG. 2B) such that each variation of month is assigned to a variation of the right wing. In other words, each of the 12 discrete months is represented by a corresponding one of twelve visual variations of the right wing such as different colors of the right wing.

The icon is then displayed according to the assignment of the visual traits to the characteristics (block 42). Hence, the icon that is displayed to represent the word processing document in the above example symbolically represents the month in which the document was created by the color variations of the right wing of the icon. In accordance with this embodiment, the assignment may be an automatic assignment or may be a user initiated assignment through a user interface.

Figure 5:
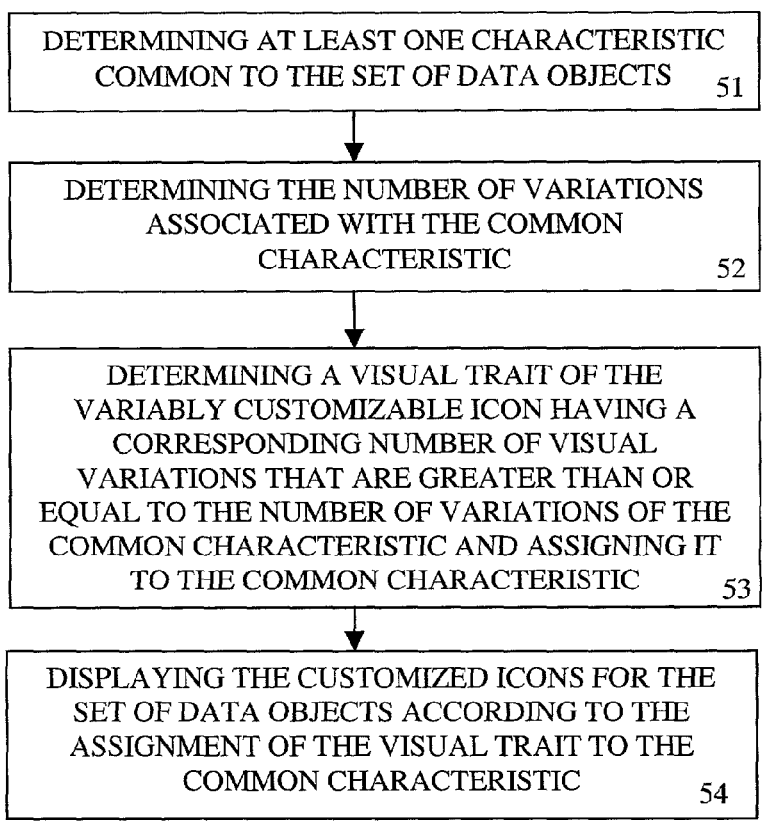
FIG. 5 illustrates a method of generating variable customizable icons for a set of data objects.

In a second embodiment of the method of generating a multi-component icon according to the present invention (FIG. 5), visual variations are optimistically assigned to characteristics so as to ensure that the number of visual variations can accommodate the number of variations of characteristics. For instance, if a file characteristic has 10 variations (e.g., 10 different subjects) and it is assigned to a visual trait having only 4 variations (e.g., 4 different patterns), then it would not be possible to symbolically show 6 of the 10 different characteristics with the icon. Hence, according to the second embodiment of the method, at least one characteristic that is common to a set of data objects (e.g., files) is determined (block 51) and the number of discrete variations associated with the common characteristic is determined (block 52). For instance, in the above example, the common characteristic would be month of creation of the word processing document and the number of discrete variations would be twelve.

A visual trait of the multi-component icon is determined having a corresponding number of visual variations that are greater than or equal to the number of variations of the common characteristic and it is assigned to the common characteristic (block 53). In other words, since there are twelve variations of the creation month, a visual trait is determined having at least twelve visual variations. For instance, as in the above example, color is chosen as the visual variation since there are at least twelve colors. The multi-component icons are then displayed for the set of data objects according to the assignment of the visual trait to the common characteristic (block 54).

Figure 3E:
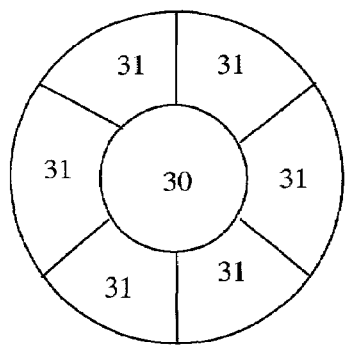

FIG. 3E shows another embodiment of the multi-component icon. This embodiment may be applied to a group of audio files where the center portion 30 has the picture of a recording artist and each portion 31 of the outside border represents groups of songs performed by the artist categorized according to different types or tempos of music (e.g., easy listening, hard rock, jazz, soft rock etc.). Alternatively, the center portion may symbolically represent a type of music and the outside border may represent songs of the type of music performed by artists that are symbolically categorized by the first letter of the artists last name.

Figure 3F:
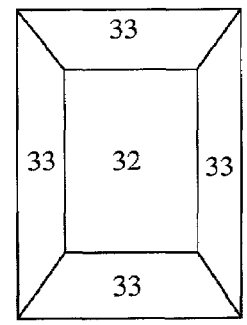

FIG. 3F shows another embodiment of a multi-component icon. This embodiment may be applied to a group of image files where the center portion 32 represents a predetermined category and the outer portions 33 represent the parent (top), sibling (sides), and child (bottom) category of the predetermined category.

Figure 3G:
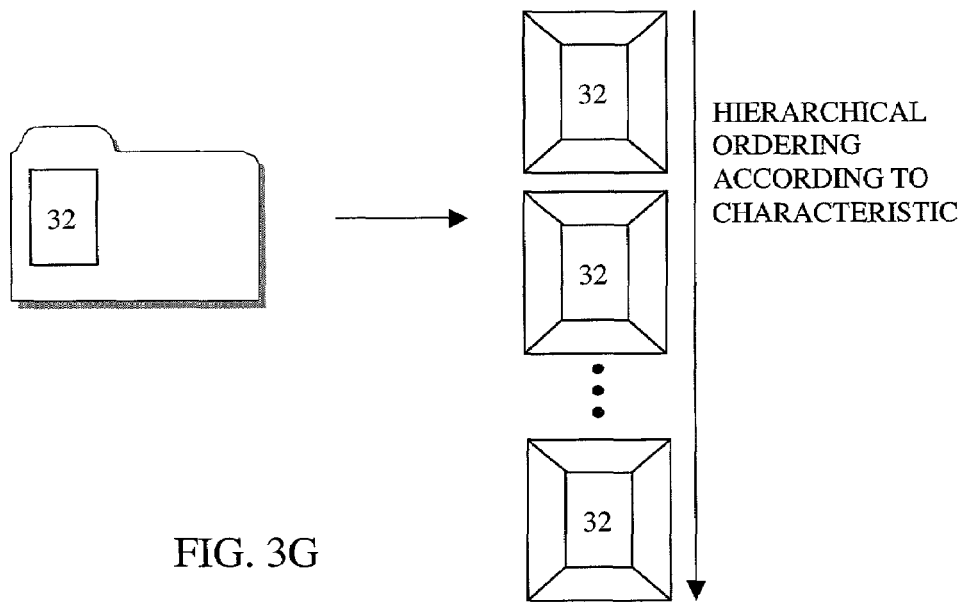

In another embodiment of the multi-component icon as applied to folder data objects, a folder can be displayed to incorporate the icon portion (portion 32, FIG. 3F) representative of the predetermined category as shown in FIG. 3G. The folder is then used to "hold" a plurality of icons corresponding to data objects having the same center portion 32. The plurality of file icons within the folder can be arranged or ordered according to each characteristic of the plurality of data objects such as according to a range of variations of a given characteristic bounded by a maximum variation and a minimum variation. For example, the center portion 32 can represent a particular test and the icons within the folder can be arranged according to the number of right test answers.

One of the practical benefits of the multi-component icon is the representation of a plurality of files using an icon that symbolically imparts information regarding the files such that they can be intuitively grouped or evaluated in an organized manner to provide the user with visually determinable statistical information.

One example of the application for multi-component icons facilitates the evaluation of a plurality of electronic word processing documents corresponding to hundreds of test answers to different tests taken on different dates. A teacher decides that he/she wants to determine how many of the students answered a particular question right/wrong on a test taken on a particular day just from viewing the listing of icons. Using a multi-component icon such as shown in FIG. 2B, the teacher assigns (using a user interface) the color red to the body 23 of the icon to represent the particular test date that he/she is interested in and the color black to the body to represent all other test dates that he/she is not interested in. In addition, the teacher assigns the color green to the right wing if the particular question on the test is answered wrong and the color blue to the right wing if the particular question on the test is answered right. The icon listing of the test answers is then displayed using the multi-component icon according to the assignments such that:

icons having a red body and a green right wing correspond to a test taken on the date of interest and having the right answer;

icons having a red body and a blue right wing correspond to tests taken on the date of interest and having the wrong answer;

icons having a black body and green wing correspond to a test taken on a date other than the date of interest and having the right answer;

icons having a black body and blue wing correspond to a test taken on a date other than the date of interest and having the wrong answer;

The system and method of the present invention may be implemented using software, hardware, or any combination of software and hardware wherein a computing system initially identifies, a set σ of characteristics having n elements: σ=($\sigma_1$, $\sigma_2$, $\sigma_3$, $\sigma_{n-1}$), for a set S of files or folders or data objects. For example, $\sigma_1$ may correspond to file size, $\sigma_2$ may correspond to date, $\sigma_3$ may correspond to lesson topic, $\sigma_4$ may correspond to grade, and $\sigma_5$ may correspond to author. This identification can be set through a user interface coupled to the computing system or set automatically by a previously determined characteristic identification setting preprogrammed into the computing system.

Once the characteristics of the data object are identified, the computing system can determine the type of each identified characteristic. For example, each characteristic element of σ may be an ordered or partially ordered. An example of an element that can be ordered is date since any variation of "date" can be sequentially ordered according to ascending or descending date. An example of a characteristic element that may be partially ordered is "lesson topic" since only a partial ordering of the variations of "lesson topic" may be achieved (i.e., ordering may be ambiguous).

Each characteristic element may be either discrete or continuous. For instance, the characteristic of "file size" is a continuous type (i.e., any size between 0 to a maximum file size) whereas the characteristic of date is a discrete type (i.e., discrete daily increments).

Each characteristic that is discrete may have finite or infinite cardinality. In other words, some characteristics may have an infinite number of variations (e.g., lightness levels in units of 1) and others may have a finite number of variations (number of eyes, shape of eyes, etc.).

Each characteristic that is a continuous type may be either periodic or aperiodic type. In other words, some characteristics may have periodic variations (e.g., hue) and others may have aperiodic variations (e.g., transparency or translucency).

The type of each characteristic is determined by analyzing the data object and its corresponding metadata. The type of each characteristic is then used to determine the optimistic visual icon trait to assign to the characteristic. Based on this analysis, the user can be presented with a selection of appropriate visual traits to choose from.

In still another embodiment of the multi-component icon, icon visual traits are interactive so as to indicate relationships between data object characteristics. For instance, in one embodiment, when a first multi-component icon is "dragged" over a second multi-component icon, one or both icons visually change to indicate similarities or differences between data object characteristics. An example of this interaction can be shown when representing two word processing files with two multi-component icons, each file corresponding to a test result. Icon interaction occurs when the test results are from the same student (i.e., same characteristic). If the test results are from the same student, when one icon is "dragged" over the other, a predetermined portion of the icon becomes transparent indicating that the test results are from the same student. In contrast, if the test results are from a different student, then either no change occurs or a different change occurs indicating that the test results are from a different student.

In the preceding description, numerous specific details are set forth, such as specific icon shapes and patterns in order to provide a thorough understanding of the present invention. It will be apparent, however, to one skilled in the art that these specific details need not be employed to practice the present invention. In other instances, well-known computer processing steps have not been described in detail in order to avoid unnecessarily obscuring the present invention.

In addition, although elements of the present invention have been described in conjunction with certain embodiments, it is appreciated that the invention can be implement in a variety of other ways. Consequently, it is to be understood that the particular embodiments shown and described by way of illustration are in no way intended to be considered limiting. Reference to the details of these embodiments is not intended to limit the scope of the claims which themselves recited only those features regarded as essential to the invention.

We claim:

1. A method of creating a multi-component icon for each of a set of data objects from characteristics of the set of data objects, the characteristics including data object content and data object metadata, the method comprising:
   determining a common characteristic of the data object metadata common to the set of data objects;
   determining the number of variations associated with the common characteristic;
   determining a visual trait of the multi-component icon having a corresponding number of visual variations that are greater than or equal to the number of variations of the common characteristic and assigning it to the common characteristic; and
   displaying the customized icons for the set of data objects according to the assignment of the visual trait to the common characteristic, each of the customized icons including icon portions, the icon portions for each of the customized icons including a main body icon portion and a pair of wing icon portions, each of the wing icon portions being directly attached to the main body icon portion and protruding from the main body icon portion.

2. The method as described in claim 1 wherein the common characteristic of the data object metadata is variably assigned dependent on user preference.

3. The method as described in claim 1 wherein the common characteristic of the data object metadata is variably assigned automatically.

4. The method as described in claim 1 wherein the icon is generated with a user initiated interface and variably assigning is selected through the interface.

5. The method of processing as described in claim 4 wherein variably assigning is session based through the interface such that in one session a given visual trait may be assigned to a first characteristic and in a second session the given visual trait may be assigned to a second characteristic.

6. The method of processing as described in claim 1 wherein variably assigning is dependent on type of characteristic.

7. The method of claim 1 wherein the main body icon portion and the pair of wing icon portions are shaped to resemble components of an ornamental Venetian glass candy.

* * * * *